(12) United States Patent
Runk et al.

(10) Patent No.: US 6,192,700 B1
(45) Date of Patent: Feb. 27, 2001

(54) AIR CONDITIONING SYSTEM FOR A MOTOR VEHICLE

(75) Inventors: Robert Michael Runk, N. Tonawanda; Theodore R. Cochran, Amherst, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/378,385

(22) Filed: Aug. 20, 1999

(30) Foreign Application Priority Data

Oct. 12, 1998 (GB) .................................................. 9822079
Apr. 30, 1999 (GB) .................................................. 9909866

(51) Int. Cl.$^7$ ................................. F25B 1/00; F25B 49/00
(52) U.S. Cl. .......................... 62/228.5; 62/160; 62/228.1
(58) Field of Search .............................. 62/228.5, 228.1, 62/228.3, 229, 160, 227, 208, 213; 236/91 C

(56) References Cited

U.S. PATENT DOCUMENTS

| 2,498,861 | * | 2/1950 | Newton ...................................... 62/4 |
| 4,248,053 | * | 2/1981 | Sisk ......................................... 62/158 |
| 4,269,261 | * | 5/1981 | Kountz et al. ........................... 165/2 |
| 4,345,442 | * | 8/1982 | Dorman ................................... 62/160 |
| 4,353,220 | * | 10/1982 | Curwen et al. ......................... 62/228 |
| 4,866,944 | * | 9/1989 | Yamazaki ................................. 62/160 |
| 4,939,910 | * | 7/1990 | Umezu et al. ........................... 62/160 |
| 4,989,414 |   | 2/1991 | Murayama et al. ................. 62/228.4 |
| 5,537,831 | * | 7/1996 | Isaji et al. ............................. 62/228.4 |
| 5,628,201 | * | 5/1997 | Bahel et al. ............................ 62/211 |
| 5,632,442 | * | 5/1997 | Misawa et al. ........................ 237/2 B |
| 5,673,568 |   | 10/1997 | Isshiki ................................. 62/228.4 |
| 5,689,963 | * | 11/1997 | Bahel et al. ............................ 62/129 |

FOREIGN PATENT DOCUMENTS 0 509 619 A2   10/1992 (EP) .
2155165        9/1985 (GB) .
2199125        6/1988 (GB) .
2289124        11/1995 (GB) .
2291181        1/1996 (GB) .
H5-87047       4/1993 (JP) .

* cited by examiner

Primary Examiner—William Doerrler
Assistant Examiner—Marc Norman
(74) Attorney, Agent, or Firm—Patrick M. Griffin

(57) ABSTRACT

An air conditioning system for a passenger compartment of a motor vehicle comprises a first heat exchanger (14) positionable outside the passenger compartment; a second heat exchanger (18) positionable inside the passenger compartment; a first fluid passage (22) between the first and second heat exchangers; a second fluid passage (24) between the first and second heat exchangers; an expansion device (16) positioned in the first fluid passage; an accumulator/dryer (20) fluidly connected with the second fluid passage; an electronically controlled variable stroke compressor (12) for pumping fluid into the second fluid passage and either in a first direction (X) sequentially through the first heat exchanger, the expansion device, the second heat exchanger and the accumulator/dryer, or in a second direction (Y) sequentially through the second heat exchanger, the expansion device, the first heat exchanger and the accumulator/dryer; reverse flow means (32) in the second fluid passage for controlling the direction of the flow of fluid; sensing means (36–48) providing an output signal dependent on one or more sensed conditions; and control means (26,30) electrically connected to the sensing means and to the compressor for receiving the output signal from the sensing means and for controlling the stroke of the compressor dependent on the output signal during fluid flow in the second direction. Provides precise control of compressor operation for improved control of passenger compartment heating.

2 Claims, 3 Drawing Sheets

AIR CONDITIONING SYSTEM FOR A MOTOR VEHICLE

TECHNICAL FIELD

The present invention relates to an air conditioning system for the passenger compartment of a motor vehicle, and more particularly to an air conditioning system which can provide both heating and cooling for the passenger compartment.

BACKGROUND OF THE INVENTION

Air conditioning systems for the passenger compartments of motor vehicles are well known. In general, these systems comprise an inside heat exchanger (located within the passenger compartment) and an outside heat exchanger (located outside the passenger compartment). A pair of fluid passages connect the heat exchangers to allow the circulation of fluid through the heat exchangers. An expansion device is positioned in one of the fluid passages. A compressor and accumulator/dryer is positioned in the other fluid passage. When fluid is pumped by the compressor through the outside heat exchanger, the expansion device, the inside heat exchanger and the accumulator/dryer in succession, air passing through the inside heat exchanger is cooled as the air flows into the passenger compartment. When fluid is pumped in the reverse direction through the inside heat exchanger, the expansion device, the outside heat exchanger and the accumulator/dryer in succession, air passing through the inside heat exchanger is heated as the air flows into the passenger compartment. A reversing valve can be positioned in the other fluid passage to provide the required flow direction for the fluid.

In general, a pneumatic arrangement is used to control the displacement of the compressor, the pneumatic arrangement having an essentially fixed control set point. Such an arrangement has restricted control and does not provide for full control of compressor displacement throughout the range of possible operating conditions, especially during heating of the passenger compartment. Also, the use of compressor speed control is unsuitable in motor vehicles because the compressor is driven by the engine of the motor vehicle, and the engine speed is continually varying.

SUMMARY OF THE INVENTION

It is an object of the present invention to overcome the above mentioned problems.

An air conditioning system in accordance with the present invention for a passenger compartment of a motor vehicle comprises a first heat exchanger positionable outside the passenger compartment; a second heat exchanger positionable inside the passenger compartment; a first fluid passage between the first and second heat exchangers; a second fluid passage between the first and second heat exchangers; an expansion device positioned in the first fluid passage; an accumulator/dryer fluidly connected with the second fluid passage; an electronically controlled variable stroke compressor for pumping fluid into the second fluid passage and either in a first direction sequentially through the first heat exchanger, the expansion device, the second heat exchanger and the accumulator/dryer, or in a second direction sequentially through the second heat exchanger, the expansion device, the first heat exchanger and the accumulator/dryer; reverse flow means in the second fluid passage for controlling the direction of the flow of fluid; sensing means providing an output signal dependent on one or more sensed conditions; and control means electrically connected to the sensing means and to the compressor for receiving the output signal from the sensing means and for controlling the stroke of the compressor dependent on the output signal during fluid flow in the second direction.

Because of the use of an electronically controlled variable stroke compressor, the present invention allows more precise control of the pumping capacity of the compressor when the air conditioning system is heating the passenger compartment. This has particular benefits when supplemental heating is required—that is, on initial starting of the engine of the motor vehicle or where an engine provides a low heat output. The present invention provides an air conditioning system which operates dependent on sensed conditions, thereby having the options of providing benefits in terms of fuel consumption, faster engine warm-up, reduced exhaust emissions, and improved passenger comfort.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
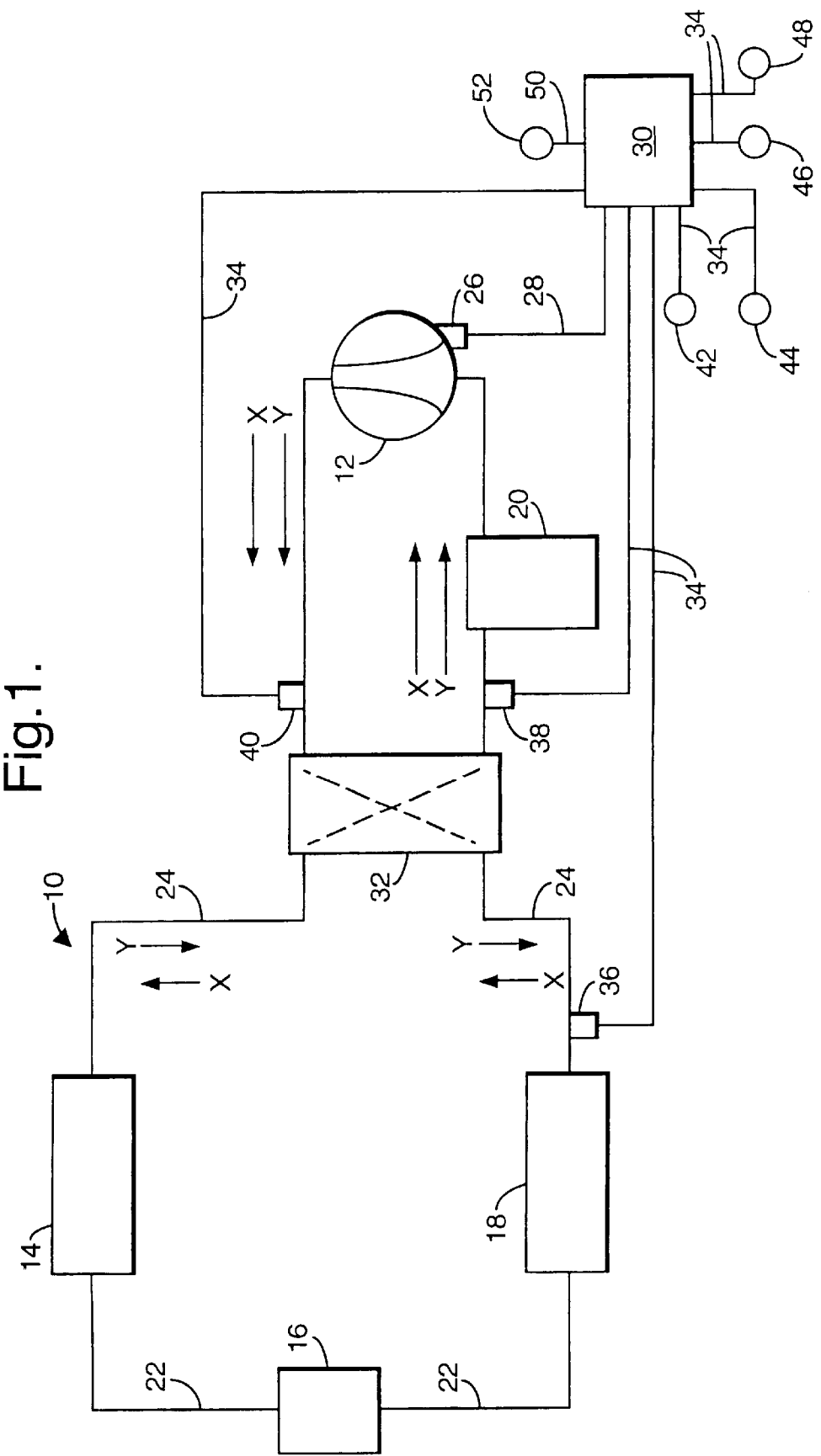
FIG. 1 is a schematic view of an air conditioning system in accordance with the present invention.

Referring to FIG. 1 of the drawings, the air conditioning system 10 in accordance with the present invention is for use in a motor vehicle for heating or cooling the passenger compartment (not shown) of the motor vehicle. The air conditioning system 10 comprises the usual components of a compressor 12, an outside heat exchanger 14, an orifice tube or expansion device 16, an inside heat exchanger 18, and an accumulator/dryer 20. A first fluid passage 22 fluidly connects the outside heat exchanger 14 with the inside heat exchanger 18 by way of the expansion device 16. A second fluid passage 24 fluidly connects the outside heat exchanger 14 with the inside heat exchanger 18 by way of a reversing valve 32. The compressor 12 and the accumulator/dryer 20 fluidly connect with the second fluid passage 24 by way of the reversing valve 32.

During normal (cooling) operation of the air conditioning system 10, the reversing valve 32 is set to allow fluid flow in the direction X such that air passing through the inside heat exchanger 18 is cooled so that the air conditioning system operates to cool the passenger compartment.

When initial, supplemental, or prolonged heating of the passenger compartment is required, the reversing valve 32 is actuated to reverse the flow of refrigerant fluid (in the direction Y) through the inside heat exchanger 18, the orifice tube 16 and the outside heat exchanger 14. In this mode, the air conditioning system 10 acts like a heat pump such that air passing through the inside heat exchanger 18 is heated so that the air conditioning system operates to heat the passenger compartment.

Figure 2:
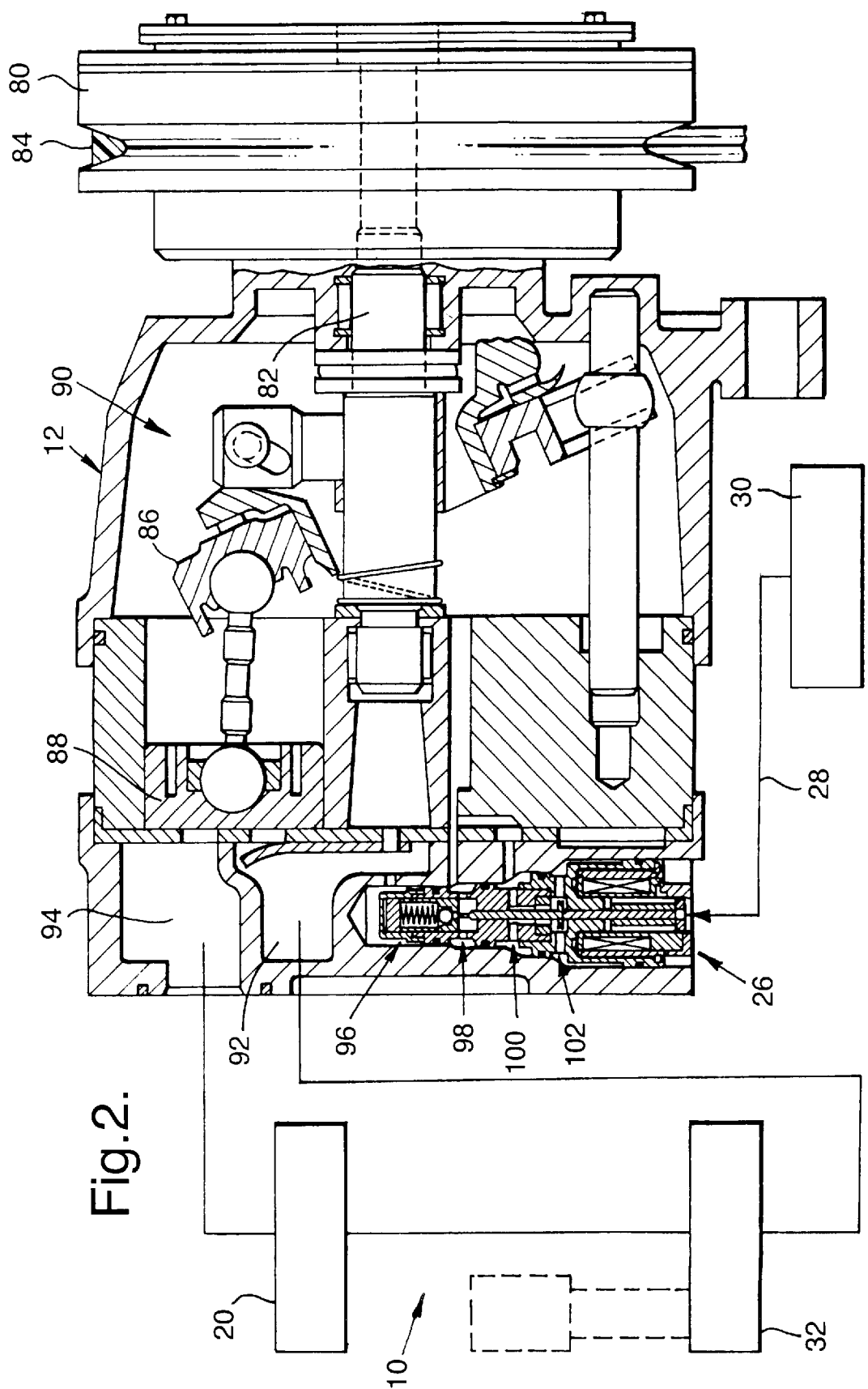
FIG. 2 is a cross-sectional view of a compressor and control valve for use in the air conditioning system of FIG. 1.

The compressor 12 is an electronically variable compressor the operation of which is controlled by an electronic displacement control valve 26. An example of a suitable compressor 12 and control valve 26 is shown in FIG. 2. The compressor 12 shown in FIG. 2 is a wobble plate compressor. As an alternative, a swash plate compressor may be used.

The compressor 12 includes a pulley 80 which is connected to a rotatable shaft 82, and which is driven by a belt 84. A wobble plate 86 is mounted on the shaft 82. The wobble plate 86 is connected to one or more pistons 88. A crankcase chamber 90 is positioned on one side of the pistons 88, with the wobble plate 86 positioned in the crankcase chamber. An outlet chamber 92 and a inlet chamber 94 is positioned on the opposite side of the pistons. The inlet chamber 94 is fluidly connected to the accumulator 20. The outlet chamber 92 is fluidly connected to the reversing valve 32. The other components of the air conditioning system 10 are fluidly connected as shown in FIG. 1. Fluid flow through the chambers 90, 92, 94, and hence the fluid pressure in the chambers, is controlled by the control valve 26.

The control valve 26 has a first port 96 fluidly connected to the outlet chamber 92; a second port 98 fluidly connected to, and acting as an inlet to, the crankcase chamber 90; a third port 100 fluidly connected to, and acting as an outlet from, the crankcase chamber 90; and a fourth port 102 fluidly connected to the inlet chamber 94. The control valve 26 is electrically connected by a line 28 to a control unit 30 which is preferably a microprocessor or other computer control unit. The control unit 30 is electrically connected by lines 34 (FIG. 1) to one or more sensors, such as a temperature sensor 36 which monitors the temperature of the fluid in the second fluid passage 24 adjacent the inside heat exchanger 18; a pressure transducer 38 monitoring the pressure of the fluid entering the accumulator/dryer 20; a pressure transducer 40 monitoring the pressure of the fluid leaving the compressor 12; a temperature sensor 42 monitoring engine coolant temperature; a temperature sensor 44 monitoring ambient temperature; a temperature sensor 46 monitoring the temperature inside the passenger compartment; and a vehicle speed sensor 48. The control unit 30 may also be electrically connected by a line 50 to a manually operated control device 52 located inside the passenger compartment and operable by a passenger in the motor vehicle to select a required temperature inside the passenger compartment.

The stroke of the compressor 12 (or, more precisely, the displacement or stroke of the pistons 88) is controlled by the operation of the control valve 26. The duty cycle of the control valve 26 is actuated to adjust crankcase fluid pressure Pc in the crankcase chamber 90; the inlet suction fluid pressure Ps in the inlet chamber 94; and the discharge fluid pressure Po in the outlet chamber 92. When the crankcase fluid pressure Pc is substantially the same as the inlet suction fluid pressure Ps, the stroke of the compressor 12 is at a maximum. When the crankcase fluid pressure Pc is greater than the inlet suction fluid pressure Ps, the stroke of the compressor 12 is reduced from the maximum stroke. By suitable control of the control valve 26, the stroke of the compressor 12 can be controlled.

In an alternative arrangement, the stroke of the compressor 12 may be controlled by an electronic control valve that meters fluid flow from the outlet chamber 92 to the crankcase chamber 90 and uses a fixed bleed from the crankcase chamber to the inlet chamber 94. In a further alternative, the reverse arrangement may be used—that is metering fluid flow from the crankcase chamber 90 to the inlet chamber 94 and using a fixed bleed from the outlet chamber 92 to the crankcase chamber. As with the duty cycle arrangement described above, these alternative arrangements also control the stroke of the compressor 12 by effecting the pressure in the crankcase chamber 90 and the pressure balance across the piston 88.

The control unit 30 monitors the signals from one or more of the sensors 36–48 and the control device 52 and controls the operation of the control valve 26, and hence the operation of the compressor 12 dependent on the sensed signals. Such an arrangement provides more precise control of the pumping capacity of the compressor 12 during the heating cycle of the air conditioning system 10 when the passenger compartment is being heated.

Figure 3:
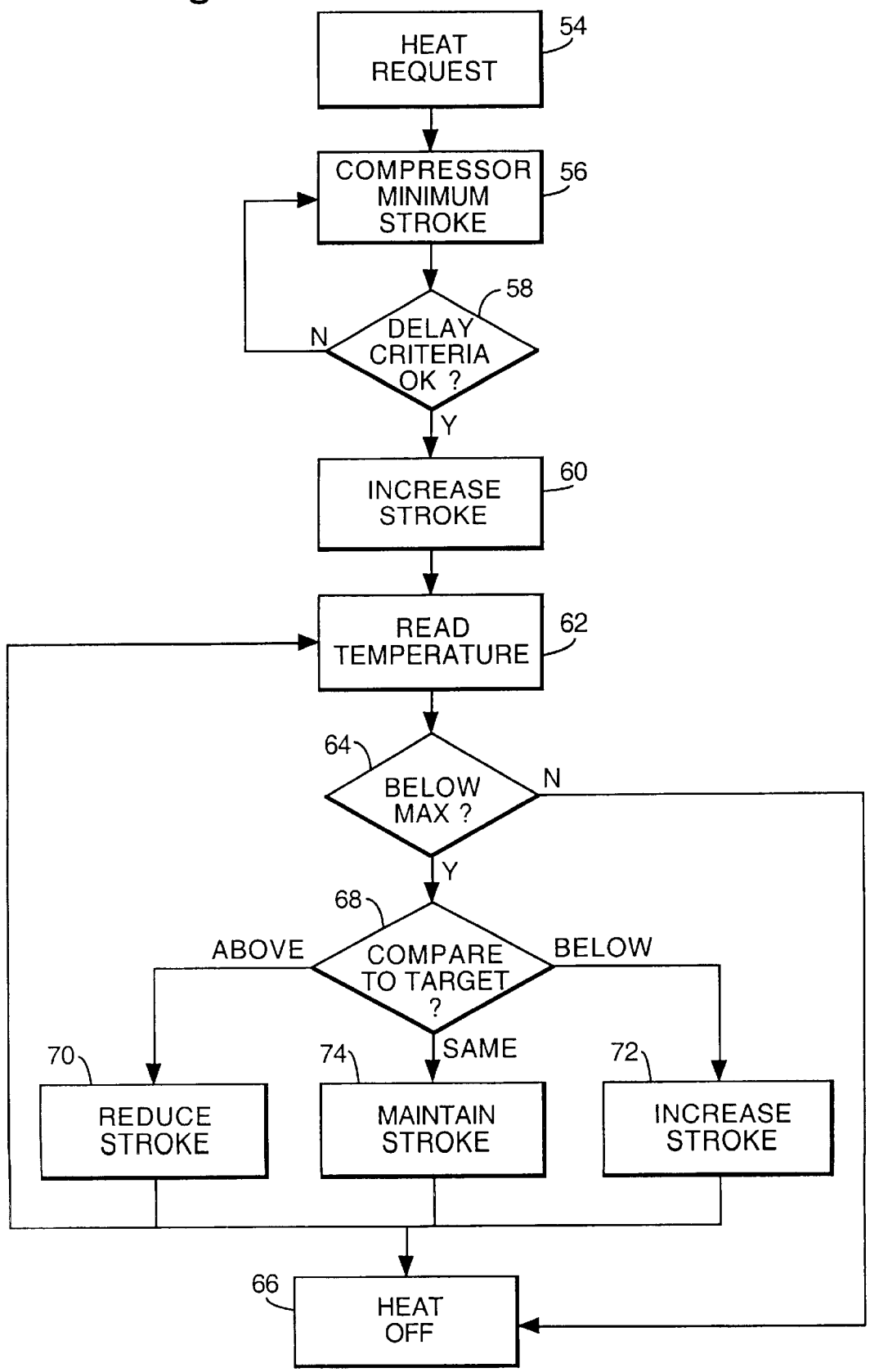
FIG. 3 is a flow chart showing one example of control of the compressor of the air conditioning system of FIG. 1.

One of the possible control sequences performed by the control unit 30 for the operation of the compressor 12 during passenger compartment heating is shown in FIG. 3. The sequence begins with an initial request, step 54, for passenger compartment heating. The control unit 30 actuates the control valve 26 to provide a minimum operating stroke for the compressor 12 at step 56. The control unit 30 then checks that any delay criteria are met at step 58. If not, the control unit returns to step 56. If yes, the control unit 30 proceeds to step 60 and actuates the control valve 26 to increase the stroke of the compressor 12. Next, at step 62, the control unit 30 monitors, for example, the temperature reading from the sensor 46 and at step 64 compares this temperature reading to a predetermined maximum level. If the temperature reading from the sensor 46 is equal to or above the predetermined maximum, the control unit 30 turns off the compressor 12 (step 66). If the temperature reading from the sensor 46 is below the predetermined maximum, the control unit 30, at step 68, compares the temperature reading to a target level. If the temperature reading is above the target level, the control unit 30 actuates the control valve 26 to reduce the stroke of the compressor 12 at step 70. If the temperature reading is below the target level, the control unit 30 actuates the control valve 26 to increase the stroke of the compressor 12 at step 72. If the temperature reading is equal to the target level, the control unit 30 leaves the control valve 26 unchanged to maintain the stroke of the compressor 12 at step 74. Following step 70, or step 72, or step 74, the control unit 30 returns to step 62 and repeats the subsequent sequence, or goes to step 66 if passenger compartment heating is no longer required.

Similar control sequences may be performed by the control unit 30 for controlling the operation of the compressor 12 during the heating cycle. For example, the stroke of the compressor 12 may be set at a maximum for rapid heating of the passenger compartment from cold start of the vehicle engine. The extra load has the side benefit of reducing the engine warm up time. After initial operation, the compressor stroke is reduced and controlled to provide a required stable temperature inside the passenger compartment. The stroke of the compressor 12 can be controlled to limit peak pressure in the fluid, reducing the risk of damage to the inside heat exchanger 18. The stroke of the compressor 12 may be controlled to provide a smooth increase in stroke and a smooth decrease in stroke to reduce the risk of fluid surges. The stroke of the compressor 12 may be altered and pressure changes monitored for detecting a low fluid level or icing of the outside heat exchanger 14. The stroke of the compressor 12 may be controlled to reduce the risk of icing of the outside heat exchanger 14, or to minimise any de-icing cycle that is required (which can lead to a reduction in the passenger compartment temperature). The adjustment of the compressor stroke improves lubrication of the compressor. The initial stroke of the compressor 12 may be controlled to reduce the risk of initial fluid surges which may damage the compressor. The control unit 30 may also monitor vehicle speed and adjust the operation of the compressor 12 during engine idle to maintain a substantially constant temperature in the passenger compartment.

Alternative reverse flow means, rather than the reversing valve 32, may be provided in the air conditioning system in accordance with the present invention. The control unit 30 may also be connected to the reversing valve 32 for controlling operation of the reversing valve.

What is claimed is:

1. An air conditioning system for a passenger compartment of a motor vehicle comprises a first heat exchanger positionable outside the passenger compartment; a second heat exchanger positionable inside the passenger compartment; a first fluid passage between the first and second heat exchangers; a second fluid passage between the first and second heat exchangers; an expansion device positioned in the first fluid passage; an accumulator/dryer fluidly connected with the second fluid passage; an electronically controlled variable stroke compressor for pumping fluid into the second fluid passage and either in a first direction sequentially through the first heat exchanger, the expansion device, the second heat exchanger and the accumulator/dryer, or in a second direction sequentially through the second heat exchanger, the expansion device, the first heat exchanger and the accumulator/dryer; reverse flow means in the second fluid passage for controlling the direction of the flow of fluid; sensing means providing an output signal dependent on one or more sensed conditions; and control means electrically connected to the sensing means and to the compressor for receiving the output signal from the sensing means and for controlling the stroke of the compressor dependent on the output signal during fluid flow in the second direction.

2. An air conditioning system as claimed in claim 1, wherein the control means comprises a microprocessor electrically connected to the sensing means, and a control valve connected to the compressor and operated by the microprocessor to control the stroke of the compressor.

* * * * *